March 23, 1965  R. J. McNAIR, JR  3,174,272
TIME SITUATION DISPLAY DEVICE FOR ARRIVING
AND DEPARTING AIRCRAFT
Filed May 31, 1963  4 Sheets-Sheet 1
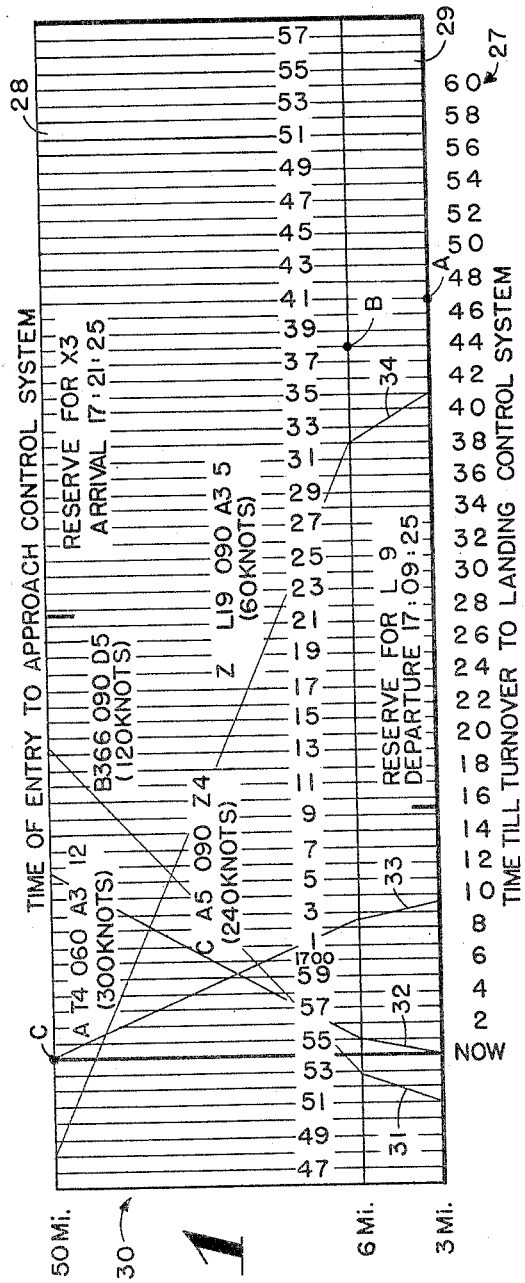
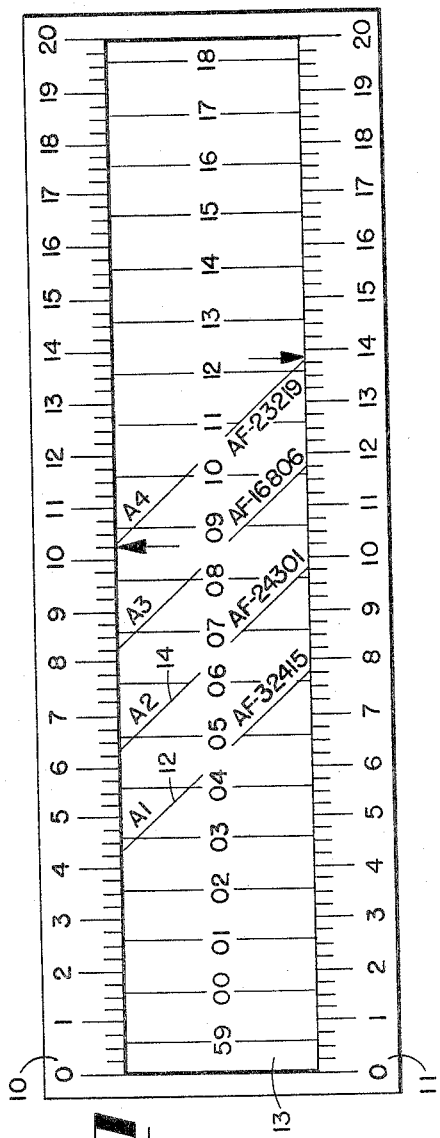
INVENTOR.
ROBERT J. McNAIR JR.
BY
ATTORNEYS.

March 23, 1965 R. J. McNAIR, JR 3,174,272
TIME SITUATION DISPLAY DEVICE FOR ARRIVING
AND DEPARTING AIRCRAFT
Filed May 31, 1963 4 Sheets-Sheet 2

INVENTOR.
ROBERT J. McNAIR JR.
BY
ATTORNEYS.

March 23, 1965 R. J. McNAIR, JR 3,174,272
TIME SITUATION DISPLAY DEVICE FOR ARRIVING
AND DEPARTING AIRCRAFT
Filed May 31, 1963 4 Sheets-Sheet 3

INVENTOR.
ROBERT J. McNAIR JR.
BY
ATTORNEYS.

March 23, 1965  R. J. McNAIR, JR  3,174,272
TIME SITUATION DISPLAY DEVICE FOR ARRIVING
AND DEPARTING AIRCRAFT
Filed May 31, 1963  4 Sheets-Sheet 4

INVENTOR.
ROBERT J. McNAIR, JR.
BY
ATTORNEYS.

United States Patent Office 3,174,272
Patented Mar. 23, 1965

3,174,272
TIME SITUATION DISPLAY DEVICE FOR ARRIVING AND DEPARTING AIRCRAFT
Robert J. McNair, Jr., Cincinnati, Ohio, assignor to Avco Corporation, Cincinnati, Ohio, a corporation of Delaware
Filed May 31, 1963, Ser. No. 284,746
1 Claim. (Cl. 58—149)

The present invention relates to air traffic control, and specifically to novel devices and methods for visually indicating certain time and range characteristics of aircraft scheduled to arrive and other aircraft scheduled to depart, in such manner that an operator of an aircraft control system can readily visualize the over-all time situation of all aircraft with which a particular air traffic control installation at a particular airport is concerned.

An object of the invention is to provide an arrangement whereby the time-range schedules of either arriving or leaving aircraft may be readily visually plotted and compared with plotted data for other aircraft, both arriving and leaving. This invention is an improvement of the basic time situation display described and claimed in the United States Patent Application of James A. Herndon entitled "Time Situation Display," Serial No. 277,146, filed May 1, 1963, now abandoned and assigned to the assignee of the present invention and application. The improvement resides in part in the provision for departing as well as arriving aircraft, as will be explained herein below.

A further object of the invention is to provide means and method for readily establishing a visual comparison of plotted data with respect to arriving and leaving aircraft, so that conflicting courses and schedules may be prevented.

Still another object is to provide for such visual comparison to the end that the handling of aircraft may be expedited and the handling capacity of an airport utilized with increased efficiency.

For a better understanding of the present invention, together with other objects, advantages, and capabilities thereof, reference is made to the following description of the appended drawings, in which:

FIG. 1 is a plan view of the tape used for plotting purposes and associated indicia;

FIG. 2 is a plan view of the plotted tape and associated indicia of the above-mentioned Herndon invention and patent application, as to which the present invention is an improvement;

Figure 3:
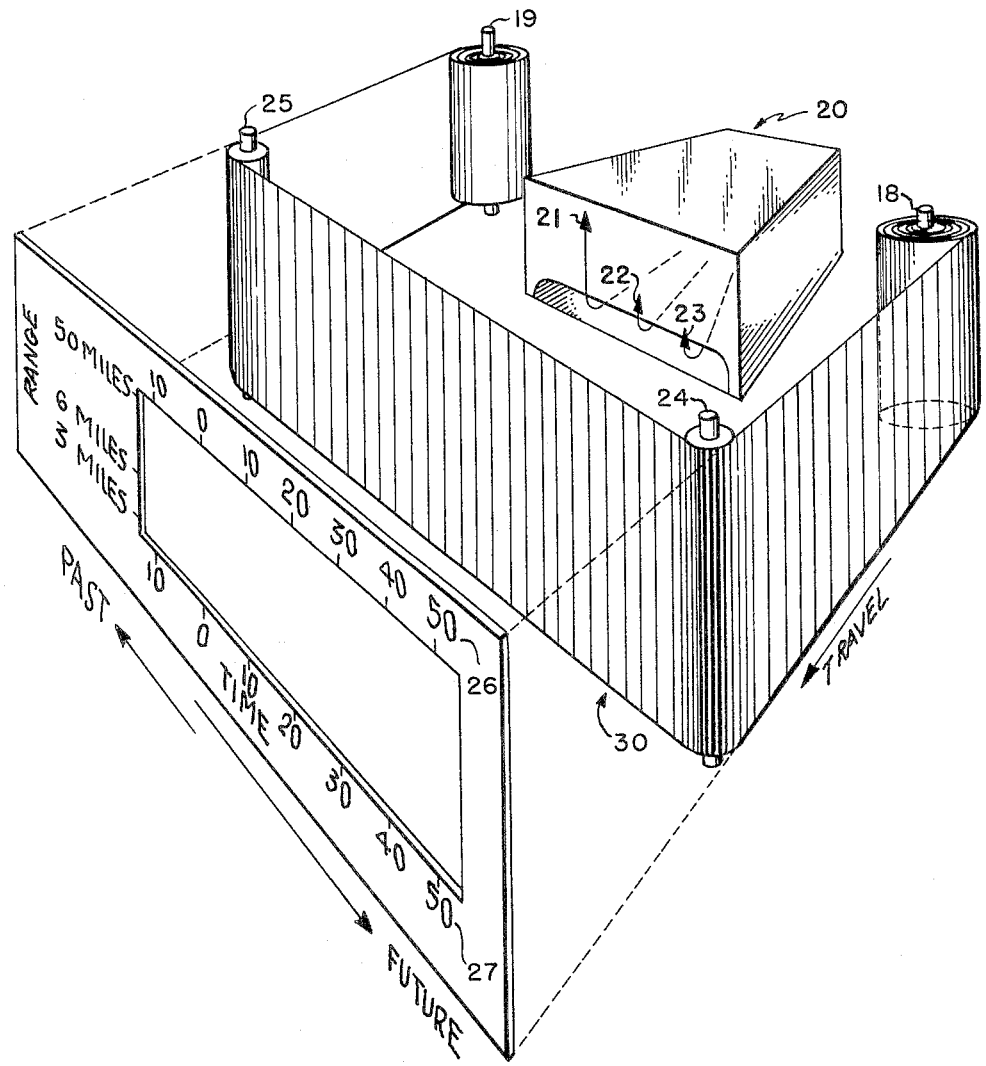
FIG. 3 is a perspective view, generally in outline form, of a plotting mechanism including tape and indicia in accordance with FIG. 1.

Reference is first made to FIG. 2 in describing certain principles utilized in the invention, so far as arriving aircraft are concerned. The subject matter of FIG. 2 herein is disclosed and claimed in the above-mentioned Herndon application, Serial No. 277,146. Parenthetically, for air traffic control two events relating to arriving aircraft are of particular concern. One is the time at which the aircraft arrives in the vicinity—i.e., at a predetermined zone spaced by several miles from the airport, this zone being referred to as the "no pass zone." The second event is the time at which the aircraft touches down at the airport.

The FIG. 2 assembly comprises a pair of spaced time scales and an intermediate tape, which moves synchronously from right to left and is also calibrated in terms of time. The plotted lines presently discussed are actually range-time lines, in that the X coordinate of any given line comprises the time intervening between the arrival of a craft at the "no pass zone" and touchdown, while the Y coordinate of the line is an analog of distance between the boundary of the "no pass zone" and the touchdown area. The horizontal distance between any pair of points on two adjacent lines represents *time* separation which will occur at the range which characterizes the points. The vertical distance between any pair of points on two adjacent lines represents the *distance* separation which will occur at the time that characterizes the latter pair of points.

The upper fixed scale 10 in FIG. 2 is calibrated in terms of minutes intervening between the present and the expected arrival of an aircraft at the "no pass zone." The lower fixed scale 11 in FIG. 2 is calibrated in terms of minutes intervening between the present and the expected touchdown of an aircraft. For example, craft A1 (AF–32415) is, according to FIG. 2, expected to arrive at the "no pass zone" in approximately 4.25 minutes, and to touch down at approximately 7.75 minutes. The plot of the line 12 for this aircraft is dynamic, in the sense that the tape on which the plot is carried moves synchronously from right to left. To illustrate this point, the time marked "00" on the tape will pass the upper and lower index marks on the scales 10 and 11 in approximately 1.6 minutes from the instant displayed in FIG. 2. The time marked "01" on tape 13 will pass those calibrations one minute thereafter. Tape 13 is therefore synchronized in clock-like fashion, the indications carried on it corresponding to those of a clock.

Let there be discussed at this point more of the history of the plot 12. Let it be assumed that the craft A1 (AF–32415) was identified when approximately 16.5 minutes from the "no pass" zone. Observations relating to its speed and the nature of the craft indicate that its anticipated time to touch down was then 20 minutes. In accordance with these data, the operator drew the slant line 12 on the moving tape and marked adjacent the line 12 identifying data with regard to the craft. The line 12 can be manually plotted on a moving tape, as shown, or automatically provided on any suitable display device with timed deflecting means for synchronously moving the line with time.

The plot 12 is kept in view from the time that the aircraft is identified until the time of touchdown.

Now let it be assumed that, approximately two minutes after the identifying and recording of A1, a similar craft A2 was sighted, identified, and then plotted, as to its characteristics, per 14.

The acquisition data pertinent to each incoming aircraft may be provided by electronic means such as radar and associated computing equipment.

The data recorded on the tape 13 are moved in clocked time continuously to show the plots of the range-time lines (12, 14, etc.) of all arriving craft in the area.

As indicated, a line such as 12 (FIG. 2) is manually plotted on the tape, or automaticcaly shown on an electronic display device, when an aircraft is acquired. The data for the starting and finishing points of this line are supplied by electronic means (not shown) and are either automatically visually displayed in the positions indicated by the arrows or are supplied to a plotting operator as the basis for manual plotting.

The relative slopes of the lines 12, 14, etc., and the spacing between them are significant. The landing approaches of aircraft are so scheduled that the lines do not cross, so that there will be no crossing of paths. Additionally, the lines are spaced in time so that there will be no simultaneity of presence of a plurality of aircraft at the same point in the approach path. This mode of presentation has a number of advantages. First, the continuous presentation, synchronized and clocked in time, permits the relative time situations of a plurality of aircraft to be maintained under continuous surveillance. The slope of each line is a measure of aircraft speed, the greater the slope the greater the speed. Since lines 12, 14, etc. of FIG. 2 have identical slopes, the four planes under observation are traveling at the same speed. The individual craft are rescheduled as required in order to keep the plotted lines from crossing or approaching too close to each other. It will of course be understood that the fact that both fast and slow speed craft are in the area establishes a need for continuous schedule restudy and possible rerouting of one or more craft.

While the above-mentioned Herndon patent application provides for the scheduling of arriving aircraft, in accordance with the present invention the indicia are so established as to indicate the time relationship between "now" and past events, as well as the time relationship between "now" and future events. Additionally, provision is made for departing as well as arriving aircraft.

Parenthetically, reference is first made to mechanism. There is provided a supply reel 18 (FIG. 3) of chart paper 30 which passes over vertically arranged idler rollers 24 and 25 toward a storage reel 19. That portion of chart paper 30 between the two idler rollers is backed by a fixed transparent backing plate (not shown). A servo control unit 20 contains electro-mechanical equipment, which need not be shown herein, for positioning illuminated arrows 21, 22, and 23 according to data received from an air traffic control data processing computer.

The principles of the present invention are now described by a consideration of plots for specific arriving and leaving aircraft. Accordingly, reference is now made to FIG. 1, and specifically to the aircraft designated "Z L19 090 A3 5," the time-range characteristics of which are indicated by the plotted line 34. This line may be deemed to have been plotted approximately six minutes ago, for purposes of this discussion. At that time the illuminated arrows 21, 22, and 23 were so positioned as to project spots through the film 30 at the points C, B, and A, respectively, and the presence of these illuminated spots then constituted a direction to the operator to plot a line on the tape 30 from C to B and then a line from B to A. Six minutes later (i.e., "now"), this plot appears in the position of line 34. This discussion assumes that the scheduling indicated by plot 34 was initially regarded as satisfactory by the operator. Suffice it to say that, before the operator plots line 34 or plots any other line on the tape 30, he takes such measures (familiar to those versed in air traffic control) as are required so to direct the craft that an acceptable plot can be made. An acceptable plot line for an arriving or departing aircraft is one which does not cross other lines for arriving or departing aircraft within the "no pass zone" or six mile limit, and one which is sufficiently spaced from the plotted lines of other arriving or departing aircraft as to permit safe handling at the airport.

It will be noted that, whereas only future events are indicated by the identical time scales 10 and 11 of FIG. 2, the time scale 27 of the FIG. 1 embodiment also provides gradations for past events to the left of the point designated "now."

While in the Herndon invention of FIG. 2 range extends from the "no pass zone" to touchdown, the range record (i.e., tape 30) of the control system in accordance with FIGS. 1 and 3 is broken down into two portions—one (i.e., 28) from 50 miles out to 6 miles out, and the other (i.e., 29) from 6 miles out to 3 miles out.

Referring again it FIG. 1, it will be understood that all plotted lines extending downwardly and to the right designate arriving craft, while those extending upwardly and to the right designate departing craft.

Several other plot lines indicating the schedules of various craft are shown in FIG. 1, and their significance is explained as follows: The craft indicated by plotted line 31, which is departing at a speed of 120 knots, has been beyond the 3-mile zone for 3 minutes and, assuming no change of speed, will remain under system surveillance for another 19½ minutes. It is now approximately 10 miles from the airport. The craft indicated by plotted line 32, also departing and traveling at 240 knots, is at a range of 3 miles, and will be outside the 50-mile range in 11½ minutes. In 9½ minutes the craft indicated by plotted line 33, arriving at a speed of 300 knots, will be 3 miles from the airport and will be turned over to Landing Control. A craft identified as "L 9" is scheduled to take off shortly, and time and area must be reserved for it; its time of entry into the 3-mile zone is estimated at 15½ minutes from now. In approximately 27½ minutes a craft identified as "X 3," which is approaching the airport, is due to enter the 50-mile zone. In 41 minutes the craft indicated by the plotted line 34, arriving at a speed of 60 knots, will reach the 3-mile range and be turned over to Landing Control.

It will be understood that as craft "L 9" and "X 3" enter the 3-mile zone and the 50-mile zone, respectively, illuminated spots indicative of their time-range characteristics will be projected onto the tape, and the operator will then plot their lines accordingly (the line for craft "L 9" extending upwardly and to the right, and the line for craft "X 3" extending downwardly and to the right) and enter data identifying each craft.

Figure 4:
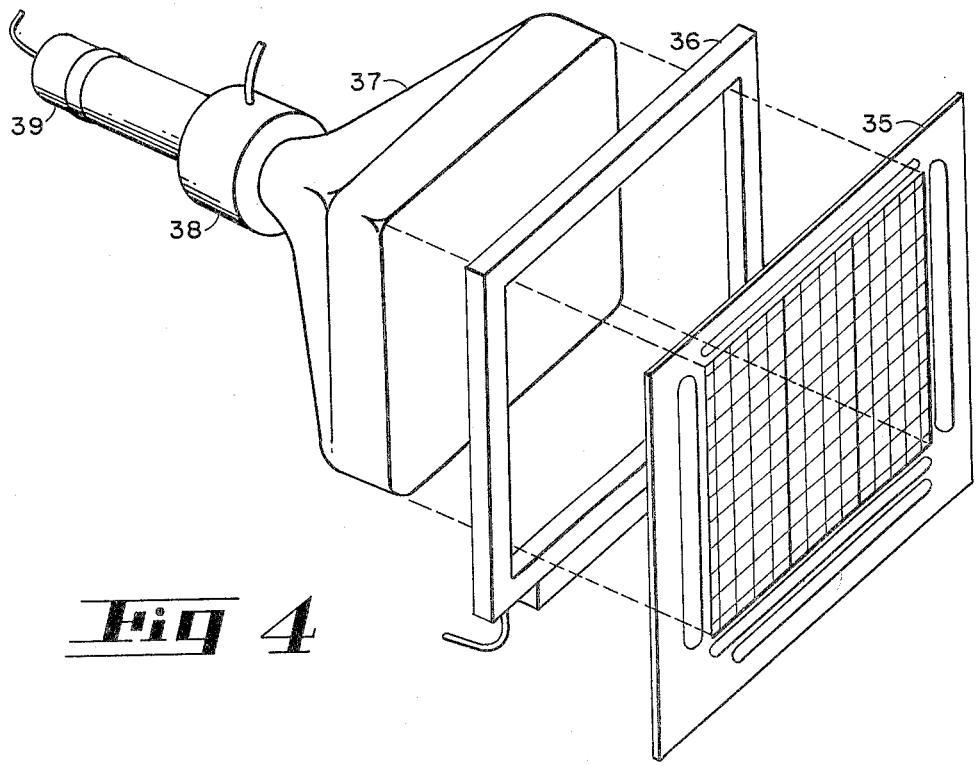
FIG. 4 is a perspective view, generally in outline form, of a display mechanism in which the time situation information is electronically beamed onto the face of a cathode ray tube whose fluorescent face is viewed by an observer through a transparent window calibrated in units of range versus time.

In FIGS. 4, 5, 6, and 7 there is shown an embodiment of the invention in which a cathode ray tube is exploited as the display element and which features a "two phase" type of operation which greatly facilitates the scheduling of aircraft. In FIG. 4 there is shown a cathode ray tube display device comprising a cathode ray tube 37, deflection yoke 38, wiring assembly 39, device 36 for lighting a back-lit front panel, and a display panel 35. The devices and techniques for applying suitable deflecting and video signals to the yoke 38 and wiring assembly 39 are well known in the art and need not be disclosed herein, a statement of the traces desired being adequate to suggest to those skilled in the art known methods and means for providing the desired traces.

Figure 6:
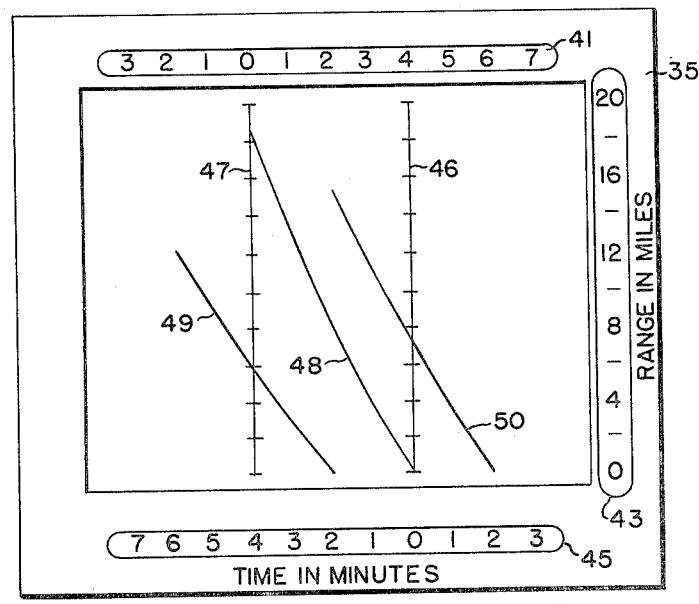
FIG. 6 is a fragmentary and enlarged view per FIG. 5 depicting only those range-time indicia used for precise scheduling of aircraft with respect to time of landing or take-off.
Figure 7:
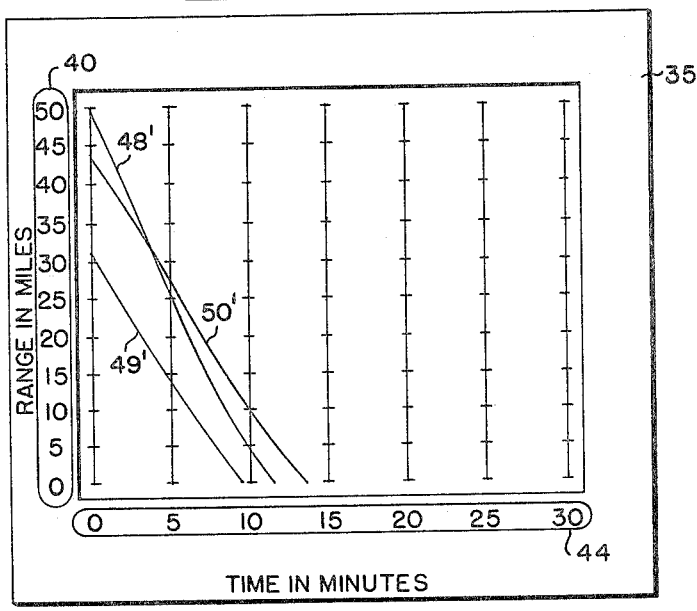
FIG. 7 is a second fragmentary and enlarged view per FIG. 5 showing the range-time indicia which cover flight operations in the entire terminal area.

On the front of the display panel (FIG. 5) there are provided vertical range-indicia 40 and horizontal time-indicia 44, these being used in the second phase of operation as illustrated in FIG. 7. Additionally, there are provided vertical range-indicia 43 and horizontal time-indicia 41 and 45, for use during the phase of operation illustrated in FIG. 6.

The unit shown in FIG. 4 can be used either in parallel with or in lieu of the equipment shown in FIG. 3. The need for a permanent and graphic time-correlated record will be a determining factor in any particular implementation.

The unit shown in FIGS. 4 and 5 functions as follows: Appropriately scaled information is introduced into cathode ray tube 37 via deflection yoke 38 and tube base wiring assembly 39. This information is used to generate a fluorescent trace on the face of the tube 37 which depicts the instantaneous range of a specific aircraft as a function of time to go (time remaining before touchdown in the case of arriving aircraft, and time left prior to take-off in the case of a departing aircraft). Lighting assembly 36 brightens the back-lit range-time indicia of front panel 35.

Figure 5:
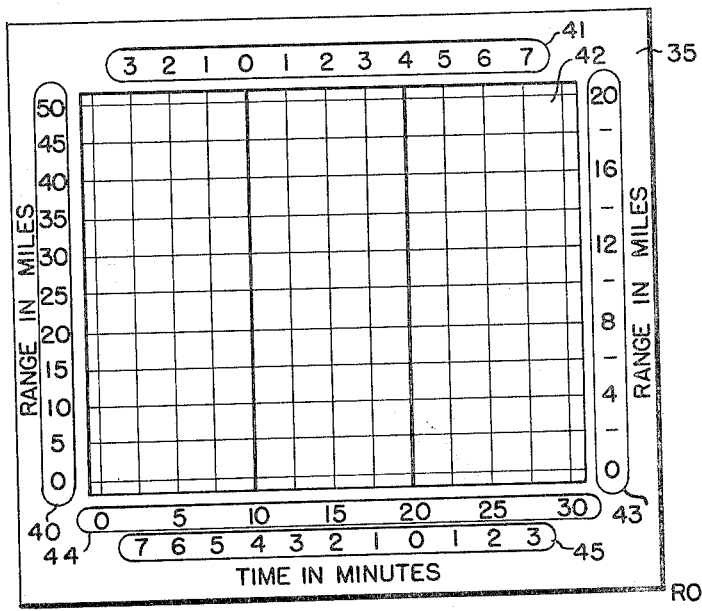
FIG. 5 is a plan view of the front panel of the mechanism depicted in FIG. 4, showing both the viewing screen through which the fluorescent surface of the cathode ray tube is viewed and the associated range versus time indicia.

FIG. 5 shows a detailed plan view of the front panel. In one phase of operational usage range-indicia 40 and time-indicia 44 are simultaneously brightened to provide calibration data for the scribed transparent viewing screen 42. In a second phase of operation, range-indicia 43 together with time-indicia 41 and 45 are simultaneously brightened to provide a second set of calibrated reference data for the scribed transparent viewing screen 42. It will be understood that the selection of indicia and simultaneous selection of input data channels are accomplished by suitable switching circuits well known in the art. Phase one and phase two usage will be separately discussed by reference to FIGS. 6 and 7.

Referring now specifically to FIG. 6, it is directed to a first phase of operation designed to assure precise scheduling of incoming aircraft in the "no pass" zone. It illustrates that set of range-time indicia 43 and 41, 45 which are useful to an air traffic controller in scheduling in advance the time of arrival of an aircraft at the touchdown end of the runway. This capability is particularly useful during periods of high traffic density under weather conditions when instrument flight rules (IFR) prevail. The time situation display shown in FIG. 6 functions as follows: Time indicia 41 are referenced to the point in time when an arriving aircraft begins a four-minute final approach inbound toward the touchdown end of a runway. Time indicia 45 are referenced to the point in time when the aircraft for which an acceptable arrival schedule is being sought will reach touchdown. Range indicia 43 cover the length in nautical miles of the four-minute final approach path for aircraft with final approach speeds as high as 250 knots. Lines 47 and 46 are scribed in the surface of the transparent window covering the face of cathode ray tube 37, and the lines 47 and 46 represent, respectively, the time at which the aircraft being scheduled will reach entry into final approach, and the time touchdown is accomplished. Time indicia 41 and 45, and hence lines 47 and 46, are not calibrated in real or clock time but have meaning only in comparison of one to the other and as regards the relative time separation of several aircraft at touchdown.

It will be observed that the right terminus of line 48 is in registry with the zero mark on time scale 45 and the zero mark on range scale 43. The significance of the numerals 1, 2, and 3 on scale 45, to the right of the zero mark, is that the craft designated by the trace 50 is scheduled to land two minutes after the craft designated by the trace 48. On the other hand, the significance of the arabic numerals to the left of the zero mark on scale 45 is illustrated by the fact that the craft designated by the trace 49 is scheduled to land two minutes before the craft indicated by trace 48. Of course the principal significance here involved is the four-minute scheduled time differential indicated by the spacing between the traces 49 and 50, which means that the craft indicated by trace 48 can be scheduled as shown.

The time scale 41 indicates the relative times at which the various craft enter the "approach" zone. Reference to time indicia 45 of FIG. 6 shows that the aircraft whose final approach phases plot as lines 49 and 50 are scheduled to touch down four minutes apart. The air traffic controller determines from the performance characteristics and present position of the airplane being scheduled that it is possible for the newly entered aircraft to land ahead of the aircraft whose final approach graphs as line 50. The controller thus decides, for purposes of this example, to have the aircraft being scheduled touch down midway in time between the two already in the system. When the four-minute final approaches of the three aircraft appear as shown by lines 49, 48, and 50, the controller will accept the flight schedule of the newly entered aircraft, since he knows that the aircraft will touch down two minutes apart (see time along zero range line) and additionally there is no range-time conflict anywhere along the final approach path which is common to all aircraft using that particular runway. As implemented lines 48, 49, and 50 are individually traced on a time-shared basis by the electron beam on the fluorescent face of cathode ray tube 37. Each line is traced in its entirety at least fifteen times per second, thus reducing flicker rate to a minimum. Further, it is well to point out that during the scheduling operation line 48 will appear to remain fixed with its left terminus on scribed line 47 and its right terminus on scribed line 46 at the point or zero range coincidence. Lines 49 and 50 will move in unison both to the left and the right during tentative scheduled adjustments of the newly arriving aircraft, since the scheduling operation seeks to adjust the flight path of the newly arriving aircraft so that its scheduled time-for-landing is delayed just sufficiently to preclude conflict on a time-space basis with aircraft already under control in the terminal area.

When an acceptable arrival schedule is determined for the newly arriving aircraft, represented by trace 48 in FIG. 6, the air traffic controller then de-activates the scales 41, 43, and 45 and activates the range scale 40 and time scale 44 illustrated in FIG. 7. Arrangements for switching on and off the illumination of scales are per se well known in the art and need not be disclosed herein. Suffice it to say that the switching of the scales dims the range-time indicia 41, 43, and 45 and brightens the range-time indicia 40 and 44. This creates the representation shown in FIG. 7 wherein lines 48', 49', and 50' represent the real world time-range data of the three aircraft used in the FIG. 6 example.

As shown in FIG. 7, the three aircraft whose range-time plots graph as lines 49', 50', and 48' are at preesnt, respectively, thirty-one, forty-four, and fifty miles away from the runway. Furthermore, the three aircraft are scheduled to land at two-minute intervals beginning nine and a half minutes from now.

Correlation of line 48' of FIG. 7 and line 33 of FIG. 1 shows that both depict an aircraft having identical characteristics as regards flight profile. By this is meant that the aircraft are identical with respect to initial range-to-go, altitude, and airspeed, as well as elapsed time in the terminal area prior to touching down on the runway. For the embodiment shown in FIGS. 1 and 3 the controller can make notations on a time synchronous belt which provides a permanent record, and in the other embodiment as shown in FIGS. 4, 5, 6, and 7, a brightened trace provides the controller with very accurate time situation data but a permanent record only when photographic media are used.

While there have been shown and described what are considered to be the preferred embodiments of the present invention, it will be understood by those skilled in the art that various modifications and changes may be made therein without departing from the scope of the invention as defined by the appended claim.

Having disclosed the invention, I claim:

An aid for air traffic control comprising, in combination:
  means including indicating needles generating a plurality of range-time characteristics of aircraft;
  a display medium in the form of a light-transmitting tape, the width of which is functionally related to the range of aircraft scheduled to be landed, and the length of which is calibrated in terms of time;
  means comprising a pair of vertically oriented spaced rollers for moving said tape longitudinally to provide a time base;
  means for projecting light so that said characteristics are plotted on and appear visibly on said tape;

and a frontal member disposed parallel to said tape and comprising a pair of spaced scales, one of which is a first fixed horizontal graduated time scale with reference to which the "time to go" prediction of arrival of an aircraft is indicated by one end of one of said characteristics, and the other of which scales is a second fixed graduated time scale with reference to which the "time to go" prediction of touch down of said aircraft is indicated by the other end of said one characteristic;

said pair of scales having aligned zero marks near their ends toward which said tape moves and being long with respect to the duration of any of said characteristics, so that a plurality of aircraft may be presented on said display medium as a plurality of spaced traces having slopes dependent on the speeds of the aircraft they designate, said pair of scales further having graduations extending in both directions from their zero marks.

References Cited by the Examiner
UNITED STATES PATENTS

| | | | |
|---|---|---|---|
| 940,079 | 11/09 | Simmen | 235—61 |
| 2,451,856 | 10/48 | Miller | 33—1 |
| 2,704,806 | 3/55 | Wallace | 325—337 |
| 3,038,661 | 6/62 | Klein | 235—189 |

LEO SMILOW, *Primary Examiner.*

JOSEPH P. STRIZAK, LEYLAND M. MARTIN,
*Examiners.*